2,859,819

HYDRAULIC FRACTURING WITH OVERFLUSHING

Donald E. Trott, Dallas, Tex., assignor to California Research Corporation, San Francisco, Calif., a corporation of Delaware No Drawing. Original application September 8, 1953, Serial No. 379,077. Divided and this application April 25, 1957, Serial No. 655,018

3 Claims. (Cl. 166—22)

This invention relates in general to the treatment of oil and gas wells, and relates in particular to the treatment of such wells to increase the production therefrom by hydraulic fracturing of the formations therein.

It is well known in the art of well stimulation to inject a fluid into a formation and apply pressure to the fluid to fracture the formation. The fluid used may be a low penetrating fluid or gel which is subsequently reacted with a solvent therefor to facilitate removal of the fluid from the well, or the fluid may be a liquid of lower viscosity which acts against an underreamed portion of the formation to produce fracturing. Spacer objects, such as sand, may be added to the fracturing fluid to act as propping agents in maintaining the fractures open after release of the fracturing pressure. After fracturing by these methods, the fractured formation is overflushed with a large volume, usually equal to the volume of fluid used during fracturing, of a low gravity oil at a pressure and injection rate usually equal to the pressure used during fracturing. This overflush is designed to carry the sand into the formation away from the well bore to prevent large quantities of sand from entering the pumps upon resumption of production from the formation.

The above prior art methods have the disadvantage that the pressures and injection rates in the overflushing operation are so high as to carry away substantial quantities of the propping sand from the critical permeability zone adjacent the well bore, resulting in an undesirable decrease in the artificially formed effective permeability of the formation.

It has also been proposed to utilize particles of abrasive material such as sand in a fluid carrier to abrade the passages of a producing formation to thereby increase the permeability thereof. The particle size is progressively increased during the treatment and the direction of flow is periodically reversed to increase the abrasive action. However, this method has the disadvantage that it relies primarily on the abrasive action of the particles, rather than hydraulic fracturing, to produce an increase in the effective permeability of the formation, with the result that a considerable amount of time and abrasive material is required to produce a substantial increase in the effective formation permeability.

These prior art methods have the further disadvantage that the concentration, or amount per unit volume, of sand in the fracturing fluid is maintained substantially constant throughout the fracturing operation. I have discovered that it is desirable that the concentration of sand in the fracturing fluid at the start of the operation be low to permit the fracturing fluid to more easily penetrate the formation passages and start the fractures, then progressively increase the sand concentration to permit gradual enlargement of the fractures, and to have a high concentration of sand in the fracturing fluid near the end of the fracturing operation to insure the deposition of a large quantity of sand to fill and prop open all of the fractures developed, particularly in the critical permeability zone adjacent the well bore.

Broadly, the present invention contemplates a method of increasing well productivity by hydraulic fracturing of the production formation, in which spacer objects are added to the fracturing liquid, and in which an overflushing fluid is applied to the fractured formation at a relatively low pressure and injection rate to carry away from the well bore particles or debris which have been abraded loose during the fracturing treatment and which are believed to be responsible for the rapid declines in production rate after the usual hydraulic fracturing operation. This overflushing fluid preferably has a high viscosity to provide greater suspending power to carry away the loose particles. The use of this high viscosity overflushing liquid may be followed by the application to the treated formation of an overflushing liquid of preferably low viscosity to displace these loose particles even farther into the formation and to re-establish a low viscosity fluid in the critical permeability zone adjacent the well bore.

It is therefore an object of this invention to provide an improved method of hydraulically fracturing a subterranean formation.

It is a further object of this invention to provide a method of increasing the productivity of a formation penetrated by a well bore by hydraulically fracturing the formation with a liquid having spacer objects suspended therein and applying a high viscosity liquid to the fractured formation at a reduced pressure and injection rate to remove fracturing debris from adjacent the well bore.

It is an additional object of the present invention to provide a method of increasing the productivity of a petroliferous formation penetrated by a well bore in which the formation is fractured by a fracturing liquid having spacer objects suspended therein, then the fractured formation is overflushed with a high viscosity liquid at a reduced pressure and injection rate to remove fracturing debris from adjacent the well bore, and then the fractured formation is overflushed with a low viscosity fluid to re-establish a low viscosity fluid in the portion of the formation adjacent the well bore.

The fluid utilized in the fracturing operation may be of any suitable type, such as a low penetrating fluid or gel. However, I have found that ordinary crude oil, often available at the well site, is very suitable. The fracturing fluid is placed in a well, at the elevation of a producing formation. Packers may be, and preferably are, used to isolate and confine the section of the well to be fractured. The fracturing fluid may be preceded by a small quantity of light oil which is pumped into the formation at a high pressure, such as 2000 p. s. i., to insure that the perforations in the formation are open for passage of the fracturing mixture therethrough.

The fracturing fluid may then be introduced into the well, and progressively increasing amounts of suitable spacer objects per unit volume of fluid are added to the fluid. Suitable spacer objects which may be used are gravel, glass, iron and steel, but preferably sand is utilized because of its low cost and ready availability. This mixture of fracturing fluid and progressively increasing concentrations of spacer objects is pumped into the zone to be fractured at a suitable rate and under a suitable pressure. By using a low concentration of spacer objects in the fracturing fluid at the start of the operation, the fracturing commences more easily, apparently because of the easier penetration of the fracturing fluid with its low spacer object content. After the fractures have been thus started, the spacer object content of the fracturing fluid is increased, to cause the fractures thus developed to open further in a gradual or stepwise fashion. Near the end of the fracturing operation, the concentration of spacer objects in the fracturing fluid is high to insure filling and propping open all the fractures developed during the operation and to leave a heavy load of spacer objects in the critical permeability zone immediately adjacent the well bore. The range of concentrations of the spacer objects in the fluid during the course of the fracturing may vary from ¼ pound per gallon of fluid to 5 pounds per gallon of fluid. The occurrence of the fracturing may be indicated by a drop or break in the pressure of the injected fracturing mixture. After fracturing, a small volume of high viscosity oil may be injected into the well to insure that substantially all of the spacer objects have entered the formation, since it appears that in some cases the spacer objects are not displaced as rapidly as the fracturing fluid in which they are suspended.

As soon as the last of the mixture of spacer objects and fracturing fluid has cleared the well bore and gone into the formation, as measured by displacement or other suitable means, the pumps supplying the fracturing mixture are slowed down or stopped and the well is sealed in, permitting the fracturing pressure to bleed off into the formation. This step is distinctly different from prior fracturing methods, in which, upon completion of fracturing, an overflush of a low viscosity fluid is pumped into the fractured formation at as high a pressure and injection rate as possible. I believe that the high pressure and high injection rate are undesirable because they tend to carry away the deposited spacer objects from the critical permeability zone adjacent the well bore, thus permitting some of the fractures in the critical zone to close and thereby reduce the effective permeability of the formation. By slowing or stopping the pumps as soon as the last of the spacer objects are cleared into the formation, the fractures in the critical zone are propped wide open and the propping objects are permitted to remain in place in the critical zone, resulting in a high effective permeability of the formation.

After the fracturing pressure has bled off into the formation, the formation may be treated with an overflush of a large volume, preferably at least equal to the volume of fracturing fluid, of a high viscosity fluid. This overflushing is done at a slow injection rate, preferably not over ¼ barrel per minute, and at as low a pressure as results from the slow injection rate, but preferably not over ½ of the average fracturing pressure. This overflush of heavy fluid is designed to clean the formation, near the well bore and on out into the formation, of particles of material which have been loosened from the formation during the fracturing operation, and to carry these particles as far from the well bore as possible. A high viscosity fluid is preferred because its greater suspending power results in more complete removal of these loose particles. I believe that the above-mentioned particles, by their deleterious bridging action in the developed fractures, are responsible for the rapid declines in production rates often observed with the prior art fracturing methods. The use of the low pressure and injection rate mentioned above in this stage is important to avoid carrying away into the formation the heavy load of spacer objects which has been deposited in the critical permeability zone of the formation. The propping spacer objects are wedged into the fractures and hence are capable of withstanding greater pressure than the loose particles which it is desired to remove. In connection with the above steps of reducing the formation pressure after fracturing and overflushing with a high viscosity fluid, it will be seen that the efficacy of these steps is not dependent upon the use of progressively increasing amounts of spacer objects during fracturing and that each of these steps independently is an improvement over the prior art fracturing methods.

The above overflushing operation may be followed by the application to the formation of a low viscosity oil to displace the above-described loose particles even farther into the formation and to re-establish a low viscosity fluid in the critical permeability zone of the formation to aid in obtaining production from the formation.

As an example of the effect of my invention on the operation of a representative well, the following data is from a well which was treated as follows: The well had been perforated from 5850 feet to 5862 feet in conglomerate and was producing an average of 77 barrels of oil per day for 16 days prior to treatment according to this invention. At the start of the treatment, 10 barrels of 40° gravity lease oil were pumped into the formation at a pressure of 2000 p. s. i. and at a rate of 1¼ barrels per minute, with no apparent pressure break or drop during this pumping. This phase of the treatment was to insure that the perforations in the formation were open for passage of the fracturing mixture.

This was followed by a mixture of 1000 gallons of 25° gravity oil and 500 pounds of sand, giving a concentration of ½ pound of sand per gallon. This mixture was pumped into the formation at a rate of approximately 1¼ barrels per minute. Then, the concentration of sand was increased to ¾ pound per gallon by mixing 500 pounds of sand with 750 gallons of the 25° gravity oil, and this mixture was pumped into the formation at the same rate of 1¼ barrels per minute. The concentration of sand was then increased to 1¼ pounds per gallon by mixing 500 pounds of sand with 400 gallons of the 25° gravity oil and this mixture was pumped into the formation at 1¼ barrels per minute.

During the pumping of the above mixtures, the pressure increased from 2000 p. s. i. to 3000 p. s. i., and then dropped to 2700 p. s. i. near the end of the treatment, probably indicating the occurrence of the fracturing. The mixture of sand and oil was followed by the injection of 3 barrels of heavy oil at 2700 p. s. i. to insure that all of the sand had cleared the hole and had entered the formation.

After completion of the above pumping, the pumps were shut down and the pressure in the formation was permitted to bleed off to 1000 p. s. i. Then 14 barrels of heavy oil were injected at a rate of ¼ barrel per minute to carry away from the well bore the particles loosened during the fracturing operation. This heavy oil overflush was followed by 3 barrels of light oil at the same injection rate, to carry the loose particles farther out into the formation and to re-establish a low viscosity oil in the portion of the formation adjacent the well bore. During the application of these heavy oil and light oil overflushes, the surface injection pressure ranged from 1000 p. s. i. to 1200 p. s. i.

After being thus treated, the well produced on consecutive days, after recovery of the treating oil, the following quantities of oil: 118, 131, 125, 118, 102, 115, 105, 116, 102, 122, 115, 102, 115, 120, 102, 127, 116, 100, 100, 108, 104, 108, 100, 104, 114, 112, 113, 108, 120, 113, 115, and 120 barrels per day with no substantial decline apparent. It is this relatively small decline in production which is believed to be the biggest advantage of the present invention over the prior art well stimulation methods. In wells treated by the method of this invention, the largest decline in production at the end of the first month after treatment has been 20 percent; whereas, in wells treated by the prior art fracturing methods, declines in production of 60 percent during the first month after treatment often occur. All of the declines mentioned are calculated after the usual flush production, which lasts a few days immediately following this type of treatment.

An example of this is shown in the case of two additional wells. One well had been producing 27 barrels of oil per day when it was treated by the method of this invention, substantially as described above. After such treatment, the well produced 91 barrels of oil per day, excluding the first two days of flush production immediately after the treatment. At the end of the first month after treatment, this well was producing 75 barrels of oil per day, representing a decline of only 18 percent, and at the end of four months after treatment, the well was producing 67 barrels of oil per day, representing a decline of only about 27 percent.

In contrast to this low decline, another well in the same field had been hydraulically fractured in accordance with the prior art method, wherein a constant concentration of sand was used and the overflushing done at a high pressure and injection rate. The well had been producing 8 barrels of oil per day prior to treatment, and immediately after treatment and after recovery of the flush production, the production increased to 47 barrels of oil per day. However, at the end of the first month after treatment, production had declined to 20 barrels of oil per day, representing a decline of almost 58 percent. At the end of the second month, production had further declined to 13 barrels per day, representing a total decline since the treatment of 72 percent. Because of this decline, the well was plugged back and fractured in another sand by the prior art method, increasing the production to 99 barrels per day. However, the production declined 42 percent during the first month after this treatment and production further declined at the end of the second month to 43 barrels per day, a total decline since the second treatment of 56 percent. Although it is realized that the above two wells are not exactly comparable, it is believed that since both wells are in the same type reservoirs in the same field, the results are indicative of the sustained improved production obtainable through use of the well stimulation method of this invention.

This application is a division of my copending application Serial No. 379,077, filed September 8, 1953, entitled "Method of Increasing Permeability of Subterranean Formations by Hydraulic Fracturing."

Although but a few embodiments have been described, it will be apparent to those skilled in the art that various changes and modifications may be made therein without departing from the spirit of the invention or the scope of the appended claims.

I claim:

1. The method for increasing the productivity of a subterranean formation penetrated by a well by hydraulic fracturing comprising the steps of pumping, under increasing pressure, a fracturing liquid having sand suspended therein into a confined zone in said well until said fracturing occurs, maintaining a decreased pressure on said fracturing liquid after fracturing occurs, subsequently injecting into said formation at a pressure and an injection rate no greater than one-half the average pressure and the average injection rate used during said fracturing a first overflushing liquid having a viscosity sufficient to carry away from the portion of said formation adjacent said well particles abraded loose during said fracturing, and then injecting into said formation at a pressure and an injection rate no greater than one-half the average pressure and the average injection rate used during said fracturing a second overflushing liquid having a viscosity appreciably lower than said first overflushing liquid to displace said first overflushing liquid from the portion of said formation adjacent said well bore.

2. The method for increasing the productivity of a subterranean formation penetrated by a well by hydraulic fracturing comprising the steps of pumping a fracturing liquid under increasing pressure into a confined zone in said well until said fracturing occurs, reducing the pressure of said liquid substantially below the pressure at which said fracturing occurred, maintaining the reduced pressure on said liquid for a period of time, subsequently injecting into said formation at a pressure and an injection rate substantially below the average pressure and the average injection rate used during said fracturing a first overflushing liquid having a viscosity sufficient to carry away from the portion of said formation adjacent said well particles abraded loose during said fracturing, and then injecting into said formation at a pressure and an injection rate no greater than one-half the average pressure and the average injection rate used during said fracturing a second overflushing liquid having a viscosity appreciably lower than said first overflushing liquid to displace said first overflushing liquid from the portion of said formation adjacent said well bore.

3. The method for increasing the productivity of a subterranean formation penetrated by a well by hydraulic fracturing comprising the steps of pumping a fracturing liquid under increasing pressure into a confined zone in said well until said fracturing occurs, reducing the pressure of said fracturing liquid in said confined zone, injecting into said formation at a pressure and an injection rate in the order of one-half the average pressure and the average injection rate used during such fracturing a first overflushing liquid having a viscosity sufficient to carry away from the portion of said formation adjacent said well particles abraded loose during said fracturing, and then injecting into said formation at a pressure and an injection rate in the order of one-half the average pressure and the average injection rate used during said fracturing a second overflushing liquid having a viscosity appreciably lower than said first overflushing liquid to displace said first overflushing liquid from the portion of said formation adjacent said well bore.

References Cited in the file of this patent

UNITED STATES PATENTS 2,596,843    Farris _____ May 13, 1952